United States Patent
Beckett

(10) Patent No.: US 6,308,505 B1
(45) Date of Patent: Oct. 30, 2001

(54) RIDING LAWN MOWER LEAF RAKE

(76) Inventor: James Beckett, P.O. Box 142, Aberdeen, OH (US) 45101

( * ) Notice: Subject to any disclaimer, the term of this patent is extended or adjusted under 35 U.S.C. 154(b) by 0 days.

(21) Appl. No.: 09/456,053

(22) Filed: Dec. 7, 1999

(51) Int. Cl.$^7$ .............................. A01D 34/03; A01D 7/00
(52) U.S. Cl. ........................ 56/16.7; 56/400.14; 37/269
(58) Field of Search ..................... 56/400.01, 400.04, 56/193, 16.1, 365, 366, 328, 380, 382, 384, 396, 397, 400, 400.14, 400.15; D8/13; 7/114, 115, 116; 37/266, 268, 269, 272, 281

(56) References Cited

U.S. PATENT DOCUMENTS

| | | | | |
|---|---|---|---|---|
| 1,794,922 | * | 3/1931 | Ravens | 56/384 |
| 2,645,891 | * | 7/1953 | Berkley | 56/10.9 |
| 2,648,946 | * | 8/1953 | Kelly | 56/385 |
| 2,898,724 | * | 8/1959 | Robinson | 56/16.1 |
| 3,438,183 | * | 4/1969 | Puretic | 56/16.1 |
| 3,765,159 | * | 10/1973 | Neff | 56/396 |
| 3,964,243 | * | 6/1976 | Knipe | 56/17.5 |
| 4,151,701 | * | 5/1979 | Marto | 56/396 |
| 4,312,095 | * | 1/1982 | Mullins | 56/400.14 |
| 4,322,936 | * | 4/1982 | Whitney | 56/16.1 |
| 4,409,781 | * | 10/1983 | Blackstone | 56/295 |
| 4,479,312 | * | 10/1984 | Turgeon | 37/219 |
| 4,558,746 | * | 12/1985 | Powell et al. | 56/396 |
| 4,715,173 | * | 12/1987 | Anderson | 56/295 |
| 4,821,500 | * | 4/1989 | MacIvergan | 56/400.01 |
| 4,987,731 | * | 1/1991 | Cianciulli et al. | 56/17.5 |
| 5,123,236 | * | 6/1992 | Bablitz | 56/17.5 |
| 5,431,001 | * | 7/1995 | Lange | 56/400.07 |
| 5,611,157 | * | 3/1997 | Ferreira | 37/266 |
| 5,819,443 | * | 10/1998 | Winter | 37/266 |
| 5,819,444 | * | 10/1998 | Desmarais | 37/281 |

* cited by examiner

Primary Examiner—Robert E. Pezzuto
Assistant Examiner—Árpád F. Kovács

(57) ABSTRACT

A leaf rake for mounting to the chassis of a conventional lawn tractor. Frame kits for attaching the leaf rake to either the front or rear of the tractor for various manufacturers. The lawn tractor may be equipped with hydraulic systems for raising or lowering the leaf rake unit. A spring loaded locking hinge mechanism allows the unit to be raised. Designed leaf raking tines and a forward sweeping leaf rake collect the leaves and allow them to be piled up for disposal.

10 Claims, 5 Drawing Sheets

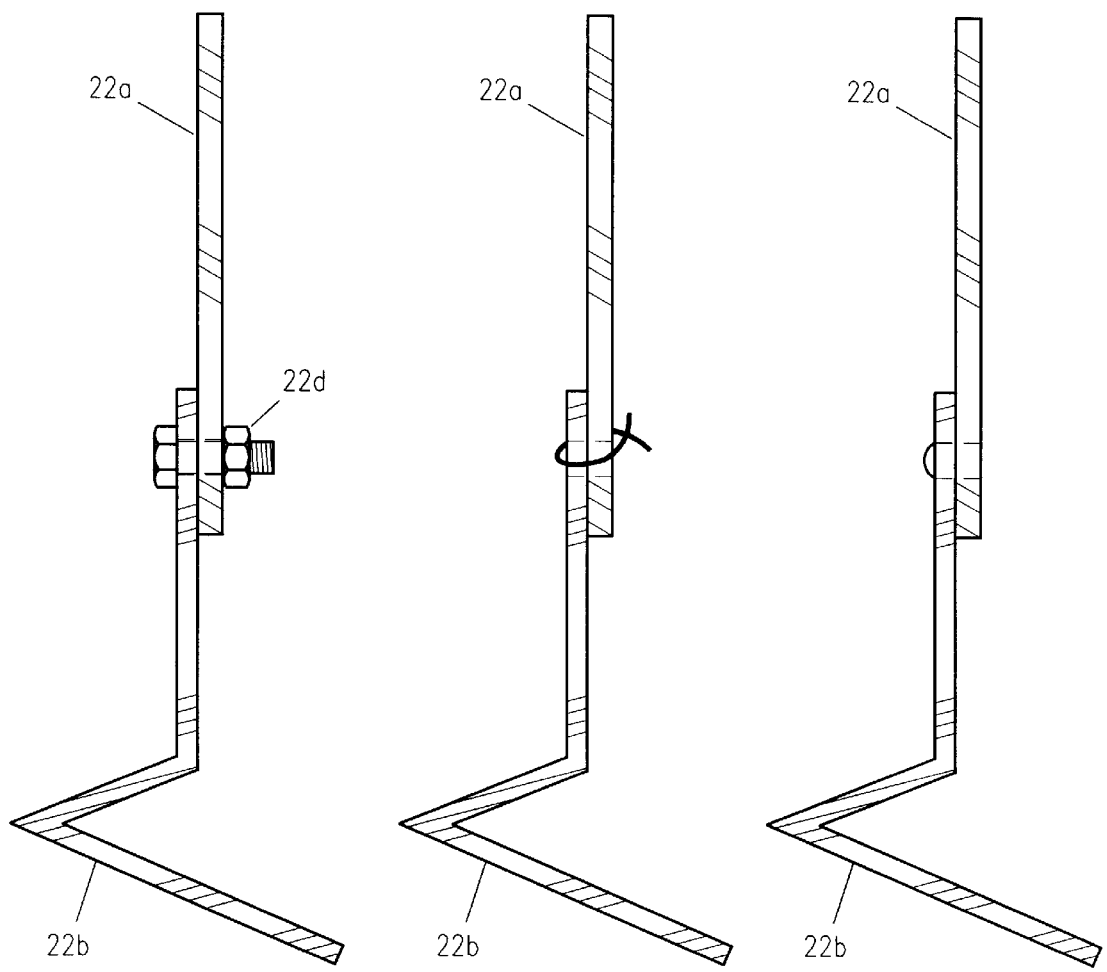
*Figure 7a*   *Figure 7b*   *Figure 7c*

RIDING LAWN MOWER LEAF RAKE

RELATED APPLICATIONS

There are no previously filed, nor currently any co-pending applications, anywhere in the world.

BACKGROUND OF THE INVENTION

1. Field of the Invention

The present invention relates generally to lawn equipment and, more particularly, to a rake attachment for a riding lawn mower.

2. Description of the Related Art

Of the many seasonal chores that people perform, the annual raking and disposal of fallen tree leaves is among the most popular and also the most despised. In performing this task, one is required to cover what is often a large area with a rake, collecting the leaves into piles for the disposal thereof. Both physically exerting and time consuming, this process can take several hours, leaving one extremely tired and worn-out. A solution to this task, just starting to find widespread use, is the leaf blower or leaf vacuum. This mechanism, while easier than raking, still requires much time to use, and in addition requires the user to stand for the entire duration.

Accordingly, there is a need for a means by which one can gather leaves into a pile in a quick and effective manner while the user sits down in a comfortable state.

In the related art, there exists some patents for leaf raking devices for attachment to a riding lawn mower as in the instant invention. However, none of them incorporate the forward sweeping side panels for collecting and directing the leaves or the novel leaf raking tines presented here.

A search of the prior art did not disclose any patents that read directly on the claims of the instant invention; however, the following references were considered related:

| U.S. Pat. No. | Inventor | Issue Date |
| --- | --- | --- |
| 5,431,001 | Lange | Jul. 11, 1995 |
| 2,898,724 | Robinson | Aug. 11, 1959 |
| 5,123,236 | Bablitz | Jun. 23, 1992 |
| 3,964,243 | Knipe | June 22, 1976 |
| 4,987,731 | Cianciulli et al. | Jan. 29, 1991 |
| 4,715,173 | Anderson | Dec. 29, 1987 |
| 4,322,936 | Whitney | Apr. 6, 1982 |
| 4,312,095 | Mullins | Jan. 26, 1982 |
| 3,438,183 | Paretic | Nov. 25, 1966 |
| 4,578,938 | Genesco | Mar. 25, 1986 |
| 4,409,781 | Blackstone | Oct. 18, 1983 |

Consequently, the development of present invention fulfills these cited needs in a manner not otherwise addressed in the art.

SUMMARY OF THE INVENTION

It is therefore an object of the present invention to provide an improved apparatus to allows for quick clean up of fallen leaves.

It is another object of the present invention to allows a user to sit on a riding mower in relative comfort.

It is yet another object of the present invention to provide a U-shaped leaf rake to gather leaves.

It is yet still another object of the present invention to provide attachment arms to attach the leaf rake in a similar manner to that of snow plows.

It is a feature of the present invention to provide a raising mechanism that allows the leaf rake to be raised while backing up or leveling leaf pile.

Briefly described according to one embodiment of the present invention, the Riding Lawn Mower Leaf Rake, as its name implies, is an apparatus that attaches to the front of a riding lawn mower to aid in the gathering of fallen leaves from lawns, drives, and other similar surfaces. The invention is "U" shaped and is approximately 48 inches wide and 30 inches tall, with the lowest four inches comprising raking tines to gather leaves. The invention attaches to the riding mower by the use of two arms in a manner similar to that which a small snow plow would attach. A mechanism for raising the Riding Lawn Mower Leaf rake is provided as well. The invention functions by pushing leaves into a central pile in much the same manner as a conventional snow plow functions. With the use of the Riding Lawn Mower Leaf Rake, a homeowner or gardener can keep a yard free of leaves in a quick, effortless manner, while sifting on a riding mower in relative comfort.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7a is a side view of one of the plurality of tines attached to the tine bar from a Riding Lawn Mower Leaf Rake; according to the preferred embodiment of the present invention.

FIG. 7b is a side view of one of the plurality of tines attached via a quick release clip to the tine bar from a Riding Lawn Mower Leaf Rake; according to the preferred embodiment of the present invention; and FIG. 7c is a side view of one of the plurality of tines snapped on to the tine bar from a Riding Lawn Mower Leaf Rake; according to the preferred embodiment of the present invention.

LIST OF REFERENCE NUMBERS

| | | | |
|---|---|---|---|
| 5 | Lawn Tractor | 22b | Tine |
| 6 | Hydraulic Cylinder | 22c | Aperture |
| 10 | Riding Lawn Mower Leaf Rake | 22d | Attachment Means |
| | | 30 | Frame |
| 20 | Leaf Rake | 30a | Right Frame Member |
| 20a | Left Panel | 30b | Middle Frame Member |
| 20b | Center Panel | 30c | Left Frame Member |
| 20c | Right Sidewall | 40 | Frame Adapter |
| 20d | Aperture | 40a | Frame Plate |
| 20e | Aperture | 40b | Locking Hinge |
| 20f | Cavity | 40c | Rake Base Plate |
| 21 | Wheel Carriage | 40d | Slot |
| 21a | Wheel | 40e | Aperture |
| 21b | First Axle | 40f | Locking Pin |
| 21c | Second Axle | 40g | Washer |
| 22 | Tine Assembly | 40h | Locking Pin |
| 22a | Tine Bar | | |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
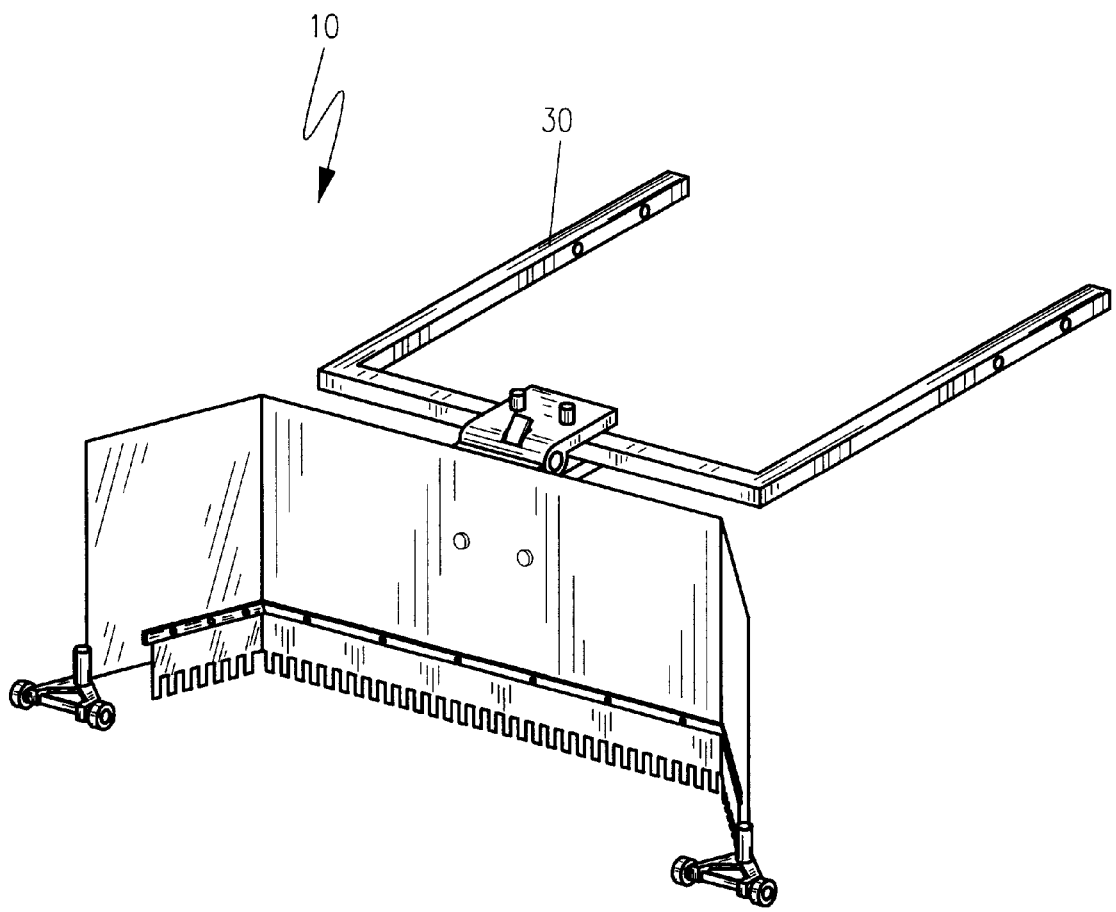
FIG. 1 is a perspective view of Riding Lawn Mower Leaf Rake, according to the preferred embodiment of the present invention.

Referring now to FIG. 1, a Riding Lawn Mower Leaf Rake 10 is shown, according to the present invention, for installation on a conventional riding lawn tractor 5. For purposes of disclosure, only one means of attachment to lawn tractor 5 is shown for attachment to the front end via a frame assembly 30. There may be other means for attachment according to the make and model of lawn tractor. The Riding Lawn Mower Leaf Rake 10 may also be attached to the rear of the lawn tractor 10 with appropriate attachment means. In the embodiment shown in the figure, the lawn tractor 5 is equipped with hydraulics on the front end as is customary for lawn tractors where a snow blade or grading blade may be attached. Typically, a hydraulic cylinder located underneath the tractor hood on both the right and left side is used to raise and lower the blade from ground level to about the level of the top of the hood. The hydraulic cylinders are connected to a frame assembly to which the blade assembly is attached. The frame assembly is pivotally mounted on the tractor chassis. The extension and retraction of the hydraulic cylinder arms drive the frame assembly upward or downward. The hydraulic cylinders are fed by a hydraulic pump powered by a take-off from the tractor engine. A set of levers mounted near the driver give the driver control over the hydraulic cylinders and hence the height of the implement mounted on the frame assembly. The present invention would be mounted on the frame assembly as a snow plow or grading blade would typically be mounted. Other tractors may not have such an arrangement so another type frame assembly would be provided to mount the raking implement directly on the chassis. The design of the frame assembly would necessarily have to be made for the various lawn tractor manufacturers.

Figure 2:
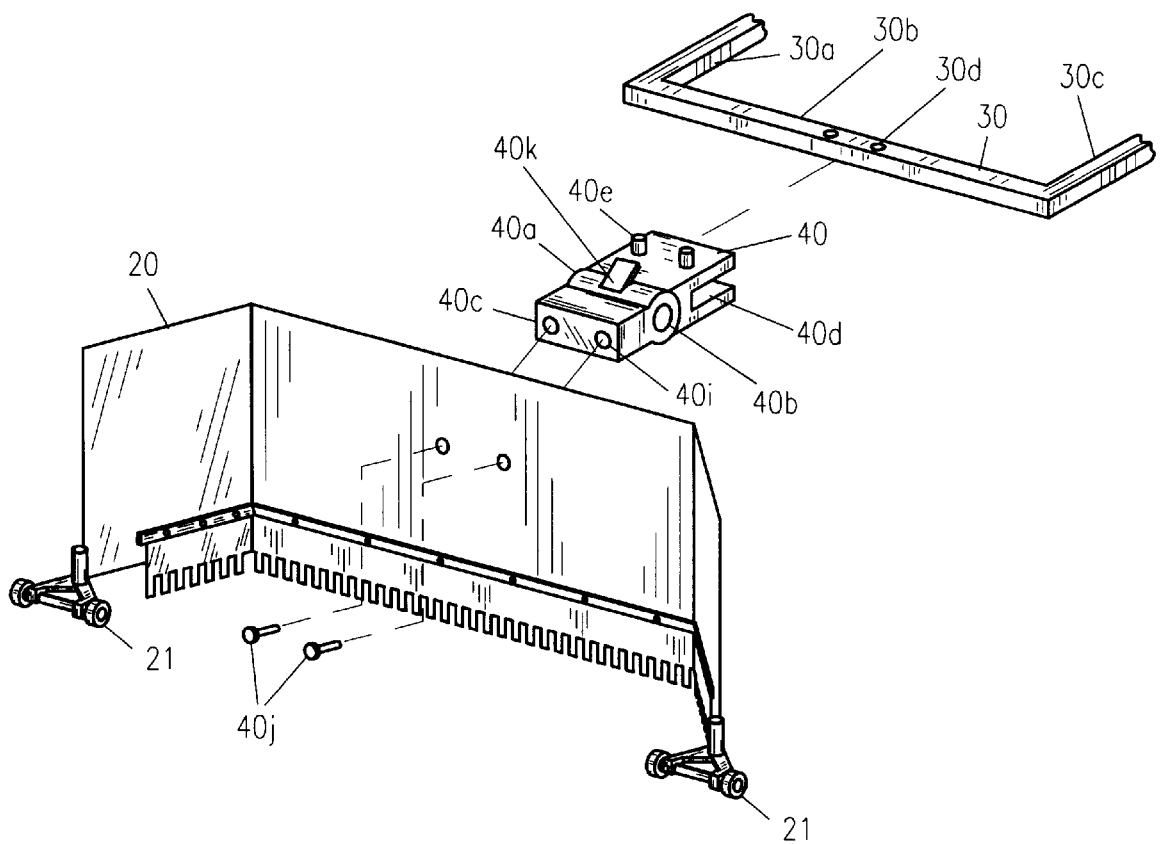
FIG. 2 is an exploded perspective view of Riding Lawn Mower Leaf Rake, according to the preferred embodiment of the present invention.

Referring to FIG. 2, shown is an exploded perspective view of a Riding lawn mower leaf rake 10, showing the detail of how leaf rake 20 is connected to frame 30 via frame adapter 40. As previously discussed, this is one means whereby leaf rake 20 may be connected to a lawn tractor 20. The means would vary by lawn tractor manufacturer. The example given is adapted to attach to the frame commonly used for snow plow blades and grading blades on conventional lawn tractors. Adapter 40 is of a three piece steel construction consisting of frame plate 40a, locking hinge 40b, and rake base plate 40c. Frame plate 40a has a slot 40d milled along its rear edge along its entire width. The front edge of frame plate 40a is butt welded to one side of hinge 40b. The other side of hinge 40b is butt welded to rake base plate 40c. Slot 40d is designed to slide over middle frame member 30b of frame assembly 30. Frame plate 40a is then secured to middle frame member 30b via a pair of pins 40f inserted into a pair of apertures 40e drilled in frame plate 40a and 30d in middle frame member 30b. Hinge 40b allows rake base plate 40c to rotate upward or downward relative to frame plate 40a. Hinge 40b is specially designed to allow this rotation upon release of a lever or button 40k and then lock it into the newly rotated position. The design of the locking and release mechanism is not important for this disclosure. A pair of threaded apertures 40i receive a pair of steel bolts 40j which hold leaf rake 20 securely to the front surface of rake base plate 40c.

Figure 3:
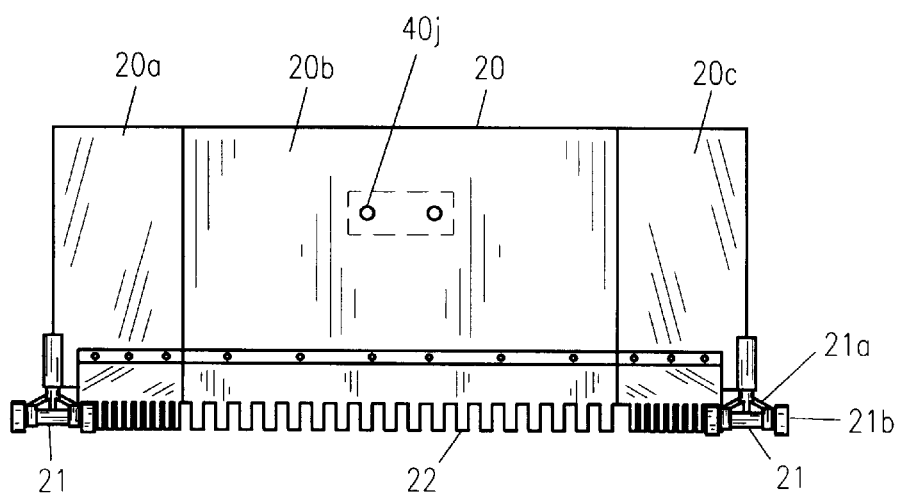
FIG. 3 is a front view of Riding Lawn Mower Leaf Rake, according to the preferred embodiment of the present invention.

FIG. 3 shows a front view of leaf rake 20 with all the sub-components assembled thereon. Leaf rake 20 is of a three panel construction where the panels are cut from sturdy steel plating. The overall dimensions of leaf rake 20 will vary for the different sizes of lawn tractors. A typical set of dimensions would be 48" inches wide and 30" high. Leaf rake 20 is comprised of a left panel 20a, center panel 20b, and a right panel 20c. Leaf rake 20 is assembled so that left panel 20a and right panel 20c are swept forward in relation to center panel 20b to form a "U" shape. The angle of sweep will be determined upon further design and testing.

Figure 4:
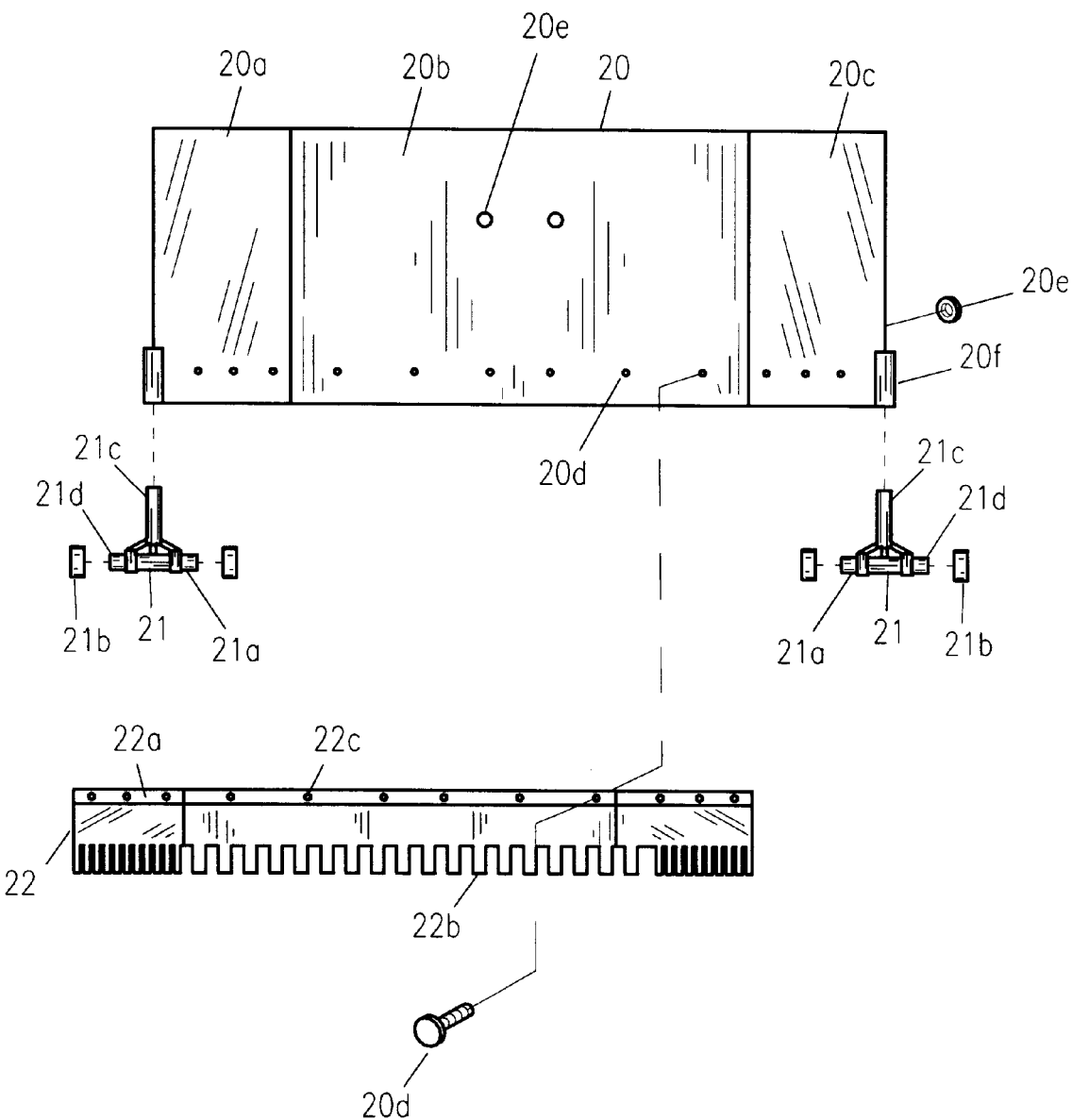
FIG. 4 is an exploded front view of Riding Lawn Mower Leaf Rake, according to the preferred embodiment of the present invention.

Referring now to FIG. 4, left panel 20a and right panel 20c are butt welded to center panel 20b. Located along the bottom edge of leaf rake 20 is tine bar assembly 22 comprised of tine bar 22 for providing support to a plurality of downwardly pointing tines 22b. Tine bar 22a is a flat strip of steel with a plurality of apertures 22c along its length for securing tines 22b. A plurality of apertures 20d located along the bottom edge of leaf rake 20 are also provided for securing tine bar 22 to the bottom edge of leaf rake 20. A plurality of bolts 20d and nuts 20e are used to secure tine bar 22 to the bottom edge of leaf rake 20 via a plurality apertures 20d and 22c drilled and aligned to match their counterpart on tine bar 22 and leaf rake 20. Tine bar 22 is not designed to encompass the entire width of leaf rake 20. This is so that a recess is left just to the right and left of tine bar 22. This recess is to allow a wheel carriage 21 to be inserted into a cavity 20f located in the bottom corner of left panel 20a and right panel 20c. Wheel carriage 21 functions to support leaf rake 20 as it moves over the ground preventing tines 22b from touching and digging in to the earth. Wheel carriage 21 is comprised of triangular shaped body 21a with a shaft 21b protruding upwardly from the center of Its upper surface. A pair of axles 21d extend sidewardly from triangular shaped body 21a for receiving a wheel 21b. Shaft 21c is inserted and locked into cavity 20f of leaf rake 20. The locking means is not important for this disclosure as well as the means where wheel 21b is secured to axle 21d. Wheel carriage is free to pivot about shaft 21c so that as leaf rake 20 is moved over the ground, the wheel carriage is free to pivot and still support leaf rake 20 as it moves through turns and deviations in the surface grade.

Figure 5:
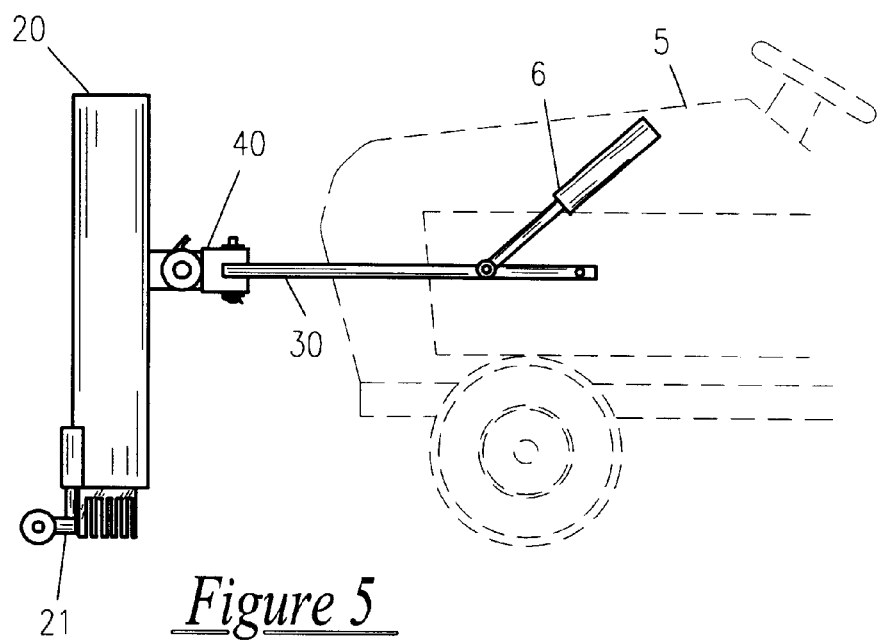
FIG. 5 is a side view of a Riding Lawn Mower Leaf Rake installed on a conventional riding lawn mower, according to the preferred embodiment of the present invention.

FIG. 5 shows the now completed assembly mounted on the front of a lawn tractor 5 via frame assembly 30 and frame adapter 40. Wheel carriage 21 is shown supporting leaf rake 20 on the ground. Deviations in the grade will cause wheel carriage 21 to lift leaf rake 20 with the deviations in grade. To also accommodate the deviations in grade, locking hinge 40 is also designed to allow rake base plate 40c to rotate about frame plate 40. To allow for this slight rotation yet keep leaf rake 20 in the proper position, it is envisioned that locking hinge 40 would be designed with a coil spring biased counterclockwise to allow a slight clockwise rotation yet force rake base plate 20*c* back to the prior position and hence leaf rake 20 on the ground. FIG. 5 also shows the contemplated installation of the Riding Lawn Mower Leaf Rake 10. As previously discussed, frame assembly 30 is most cases can be pivotally mounted on the chassis of lawn tractor 5 with the hydraulic cylinder 6 pivotally connected to right frame member 30*a* and left frame member 30*c*. In this fashion, the lawn tractor operator can raise or lower leaf rake 20 via levers mounted near the operator panel in situations such as backing or pushing leaves into a pile.

Figure 6:
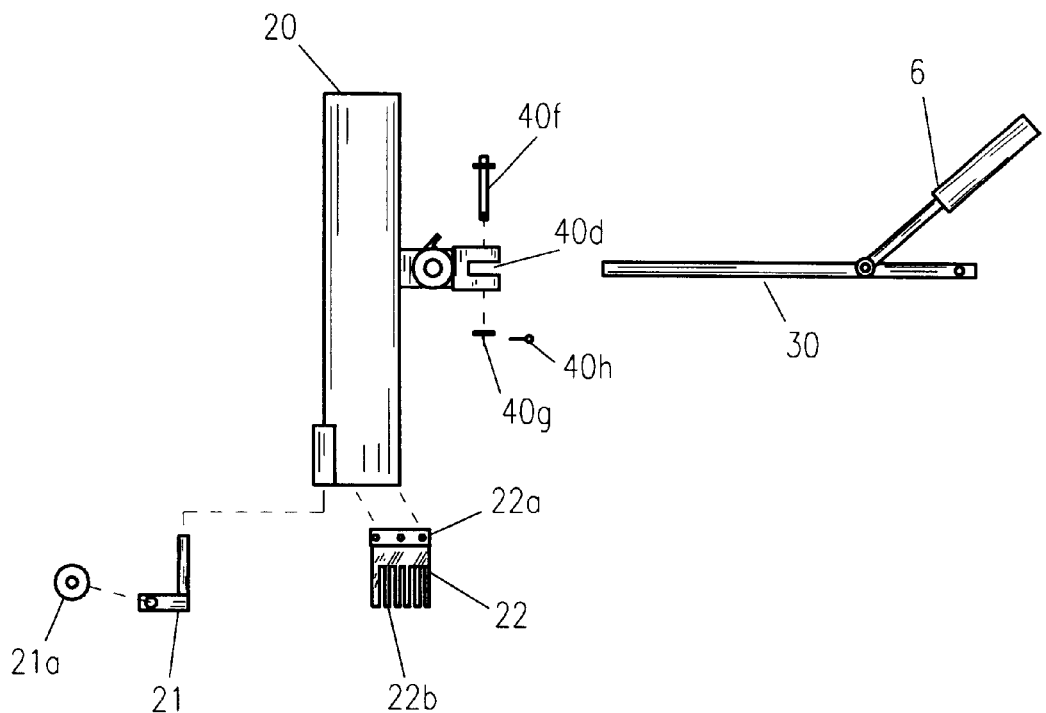
FIG. 6 is an exploded side perspective view of Riding Lawn Mower Leaf rake ready for installation on a conventional riding lawn mower, according to the preferred embodiment of the present invention.

FIG. 6 is an exploded side view of how leaf rake 20 is mounted onto frame assembly 30. Slot 40*d* is slide onto middle frame member 30*b* and secured thereto via a pair of pins 40*f*, a washer 40*g*, and locking pin 40*h*. In this fashion, leaf rake 20 can quickly and easily be mounted or removed.

FIG. 7 is a side view showing the attachment of one of a plurality of tines 22*b* to tine bar 22*a*. Tine 22*b* is shaped as shown so that it will go underneath the leaf as leaf rake 20 traverses over the ground. The free end of tine 22*b* is actually lower than the pointed end so the pointed end acts as a leaf catcher and forces leaves upward as it moves over the ground. Tine 22*b* is made from spring steel so that it may flex up and down and back and forth as required. Tine 22*b* can be connected to tine bar 22*a* as shown with a nut and bolt as shown or another other suitable means such as quick release clips, snap on, or machine screws threaded adapted for use with said aperture. Whatever the arrangement, each one of the plurality of tines 22*b* must be easily removed for replacement as required.

2. Operation of the Preferred Embodiment

To use the present invention, one mounts it on the front of a conventional lawn tractor much like a snow plow or grading blade. The universal style leaf rake may be adapted to mount on a lawn tractor with or without conventional hydraulics. In either case, a kit is provided to mount the leaf rake assembly to the chassis of the lawn tractor. Optionally, kits will be made available to mount it on the rear of the lawn tractor.

Once assembled, the height and angle of the leaf rake is adjusted via a special hinge mechanism. Units mounted on tractors with hydraulic lifters can be adjusted after the tractor is in motion. In either case, it is desirable to have the leaf rake resting gently on the wheel carriage assemblies mounted on the bottom edge of the unit. Once in place, the tractor operator can proceed to rake leaves from a lawn by placing the tractor in either first or second gear. Excessive speed can damage the wheel carriages or the raking tines. It is most desirable to rake leaves by proceeding in rows and overlapping the previous row by about six inches. The sweeping tines and the forward sweep of the right and left panels force the leaves forward into a pile. Using this overlapping sweeping motion, an entire lawn can be cleared of leaves quickly and effortlessly.

In some cases it may be necessary to raise the unit slightly, especially where uneven terrain is expected. The spring loaded hinge mechanism can compensate for slight deviations in surface grade. The unit may be raised also by releasing the locking mechanism on the hinge assembly and lifting the unit. Releasing the locking mechanism lever will now lock the unit in place. The unit may be raised via the tractors hydraulics if so equipped.

The specially designed tines on the unit require no maintenance except for periodic individual replacement when breakage occurs.

The foregoing description is included to illustrate the operation of the preferred embodiment and is not meant to limit the scope of the invention. The scope of the invention is to be limited only by the following claims.

What is claimed is:

1. An apparatus for raking leaves by attachment to a tractor chassis of a conventional lawn tractor, said apparatus comprising:

a leaf rake, said leaf rake being comprised of a left panel, a center panel, and a right panel made of sheets of steel plating assembled together so that said left panel and said right panel are swept forward in relation to said center panel to form a U shape;

an attachment means, said attachment means for attaching said leaf rake to said lawn tractor;

a tine bar, said tine bar located along a bottom edge of said leaf rake attached via a plurality of apertures located along the bottom edge of said leaf rake and a plurality of bolts and nuts;

a plurality of tines, said plurality of tines supported by said tine bar wherein each of said plurality of tines has an aperture formed therein to attach it to said tine bar;

a wheel carriage, said wheel carriage being inserted into a cavity located in a bottom corner of said left panel and said right panel to support said leaf rake as it moves over the ground preventing said tines from touching and digging in to the earth, wherein said wheel carriage is further comprised of:

a triangular shaped body;

a shaft, said shaft protruding upwardly from the center of an upper surface of said triangular shaped body;

a pair of axles, said pair of axles extending sidewardly from said triangular shaped body;

a pair of wheels, wherein each wheel from said pair of wheels is received by one axle from said pair of axles; and wherein said shaft is inserted and locked into said cavity of said bottom corner of said left panel and said right panel via a locking means. and said wheel carriage is free to pivot about said shaft.

2. The apparatus for attachment to a conventional lawn tractor for raking leaves of claim 1, wherein each of said plurality of tines is made from spring steel so that it may flex up and down and back and forth as required, and wherein each of said plurality of tines has a free end and a pointed end wherein said free end of said tine is actually lower than said pointed end so said pointed end acts as a leaf catcher and forces leaves upward as it moves over the ground.

3. The apparatus for attachment to a conventional lawn tractor for raking leaves of claim 2, wherein each one of said plurality of tines may be easily removed for replacement as required.

4. The apparatus for attachment to a conventional lawn tractor for raking leaves of claim 3, wherein said attachment means is comprised of:

a frame assembly, said frame assembly pivotally mounted on a front of said tractor chassis and comprised of a left frame member, middle frame member, and a right frame member, a frame adapter, said frame adapter for attaching said leaf rake to said frame assembly and comprised of a three piece steel construction consisting of a frame plate, a locking hinge, and a rake base plate.

5. The apparatus for attachment to a conventional lawn tractor for raking leaves of claim 4, wherein a front edge of said frame plate is butt welded to one side of said locking hinge and another side of said locking hinge is butt welded to said rake base plate.

6. The apparatus for attachment to a conventional lawn tractor for raking leaves of claim 5, wherein said frame plate has a slot milled along its rear edge along its entire width, and wherein said slot is designed to slide over a middle frame member of said frame assembly secured to said middle frame member via a pair of pins inserted into a pair of apertures drilled in said frame plate and in said middle frame member, and said leaf rake is attached to a front surface of said rake base plate via a pair of threaded apertures which receive a pair of steel bolts.

7. The apparatus for attachment to a conventional lawn tractor for raking leaves of claim 6, wherein said locking hinge allows said rake base plate to rotate upward or downward relative to said frame plate, and wherein said locking hinge is specially designed to rotate upon release of a lever or button and then lock said rake base plate into the newly rotated position.

8. The apparatus for attachment to a conventional lawn tractor for raking leaves of claim 7, wherein said locking hinge is spring biased counterclockwise to allow a slight clockwise rotation of said rake base plate yet force said rake base plate back to a prior position and hence hold said leaf rake on the ground.

9. The apparatus for attachment to a conventional lawn tractor for raking leaves of claim 8, wherein hydraulic cylinders from said lawn tractor may be pivotally attached to said right frame member and said left frame member to drive said frame assembly upward or downward.

10. The apparatus for attachment to a conventional lawn tractor for raking leaves of claim 8, wherein said leaf rake may be attached to the rear of said lawn tractor.

* * * * *